United States Patent [19]
Gauthier et al.

[11] Patent Number: 5,793,946
[45] Date of Patent: Aug. 11, 1998

[54] RUN-TIME DIAGNOSTIC SYSTEM

[75] Inventors: Forrest P. Gauthier, Maineville; Dimitrije L. Jovic, Cincinnati, both of Ohio

[73] Assignee: Varis Corporation, Mason, Ohio

[21] Appl. No.: 614,267

[22] Filed: Mar. 12, 1996

[51] Int. Cl.$^6$ ............................................. G06F 11/00
[52] U.S. Cl. ............................................. 395/183.01
[58] Field of Search ........................... 395/183.01, 180, 395/183.07, 183.13, 183.19, 183.2, 185.01, 821, 909; 371/48; 324/73.1, 500; 370/241, 242, 258, 450, 452

[56] References Cited

U.S. PATENT DOCUMENTS

| | | | |
|---|---|---|---|
| 4,023,142 | 5/1977 | Woessner | 340/172.5 |
| 4,439,826 | 3/1984 | Lawrence et al. | 364/200 |
| 4,701,917 | 10/1987 | Jones et al. | 371/16 |
| 4,710,927 | 12/1987 | Miller | 371/15 |
| 4,729,124 | 3/1988 | Hansel et al. | 371/18 |
| 4,748,843 | 6/1988 | Schäfer et al. | 73/117.3 |
| 4,870,638 | 9/1989 | Kawano et al. | 370/13 |
| 4,870,704 | 9/1989 | Matelan et al. | 364/200 |
| 5,097,470 | 3/1992 | Gihl | 371/62 |
| 5,163,052 | 11/1992 | Evans et al. | 371/18 |
| 5,319,775 | 6/1994 | Loges et al. | 395/575 |
| 5,327,435 | 7/1994 | Warchol | 371/16.1 |
| 5,414,365 | 5/1995 | Coggins et al. | 324/607 |
| 5,548,587 | 8/1996 | Bailey et al. | 370/60.1 |
| 5,594,860 | 1/1997 | Gauthier | 395/501 |
| 5,596,716 | 1/1997 | Byers et al. | 395/185.01 |
| 5,640,521 | 6/1997 | Whetsel | 395/311 |

OTHER PUBLICATIONS

Product Data Literature, MAX7219, "Serially Interfaced, 8–Digit LED Display Driver", Maxim Integrated Products, pp. 1–12, Nov. 1996–(Rev. 2).

Primary Examiner—Robert W. Beausoliel, Jr.
Assistant Examiner—Stephen C. Elmore
Attorney, Agent, or Firm—Thompson Hine & Flory LLP

[57] ABSTRACT

An on-board diagnostic system which comprises dedicated hardware for performing run-time diagnostics on a computer board having several functional sections. The diagnostic system utilizes a serial token ring network, which preferably has a software-independent, hardware core, comprising a non-intelligent master device and a plurality of non-intelligent slave devices. The master and slave devices are all interconnected via a dedicated serial data bus which operates independently of the on-board CPUs and on-board CPU buses. Each slave device is responsible for monitoring a particular section of the computer board. The master device polls each slave device by activating a corresponding token line on each slave device for a predetermined period of time, one at a time, until the master device is alerted by a slave device that a change of state has occurred in the status signals of that particular section. If there is a change in state for that particular section of the board, the corresponding slave device will begin transmitting data on the serial bus the next time that the Master device activates the token line for that slave device. Once the master device sees this activity on the serial bus, the master device will then maintain the corresponding token line active for a predetermined period of time in order to receive a bit-stream from the corresponding slave device over the serial data bus. Preferably, the bit-stream contains a source address (the address of the slave device sending the message), a destination address (the address or addresses to which the message data is to be sent) and the data which indicates the change. The master device will then transmit the diagnostic data to the particular destination devices indicated by the destination addresses.

27 Claims, 5 Drawing Sheets

RUN-TIME DIAGNOSTIC SYSTEM

BACKGROUND

The present invention relates to a diagnostic system for performing diagnostics on a computer board, and more particularly to a serial analysis token ring network diagnostic system comprising dedicated hardware for performing run-time diagnostics on a computer board such as a printer controller board.

The printing industry has advanced to the point that printing capabilities are no longer limited by the print engine speed, but rather by the amount of processing time required by the print controllers. Furthermore, as the raster printer controllers move into the field of variable data printing, in which each page map shares a common background, and at least one set of image data bits changes for each page, the processing and dispatching times of such page-maps becomes increasingly significant. Therefore, on computer boards such as these raster-printer controllers, it is desirable to breakup the controller architecture into a number of functional subsections, where each section is controlled by a dedicated microprocessor or micro-controller and/or a high performance dedicated hardware device (i.e., an ASIC device), operating in a parallel fashion, and where each processing section is responsible for a specific functional operation. For example, in the raster printer controller system described in U.S. patent application Ser. No. 08/379, 735, now U.S. Pat. No. 5,594,80, the functions of the raster printer controller are broken up into at least three processing units operating in parallel fashion to form a rasterization pipe line for a print engine; and the task of converting a page description language (PDL) data stream into a page map and delivering that page map to the marking engine is divided into sequential tasks distributed down the processing pipeline.

The first processing section in the pipe line is an input/output section, controlled by an input/output processor ("IOP"), which is responsible for the communications functions of the print operations, including network communications and data stream reception from the work station. The input/output processing section is connected to the main processing section, controlled by the main processing unit or processor ("MPU"), which is responsible for interpreting the data stream from the input/output processing section to produce rendering commands, and performs a first-stage banding process of breaking up the page into a number of geographical regions or bands. The main processing section is in turn connected to the graphics processing section, controlled by a graphics processing unit or processor ("GPU"), which is responsible for creating the bit maps from the rendering commands and performs a second stage banding operation of transferring the rendered bit-map bands to the print engines or to and from memory banks. For a detailed description of the graphics processing section and the second stage banding operations, see U.S. patent application, Ser. No. 08/558,007.

Therefore, because of the finely tuned band-width requirements of these on-board processors, it is desirable to provide on-board diagnostic systems which run independently of the processors and the on-board processing busses, and that have the ability to continue monitoring and reporting diagnostic data in the event of total CPU or CPU-bus failure.

U.S. Pat. No. 5,163,052 to Evans et al. discloses a diagnostic system for a multiple-board computer system which can operate separately from the computer boards' central processing units so that board failures will not prohibit diagnostic routines. Each computer board includes an intelligent and programmable microcontroller unit ("MCU") responsible for performing most of system's diagnostic functions; and the multiple-board diagnostic system further includes two additional diagnostic processor boards or a single microcomputer serving to monitor the diagnostic operations of the on-board MCUs. However, because this diagnostic system is specifically designed for a multiple-board computer system, it cannot easily be reconfigured to be mounted on and operate on a single computer board.

In addition to not being configurable for a single board computer system, the Evans et al. diagnostic system has several additional disadvantages. First of all, Evans et al. requires programmed intelligent MCU units to perform the diagnostics on each computer board. While these MCUs may be more reliable than the on-board CPUs, they are still highly subject to failures because they require software programming, and they perform memory addressing and access operations.

Thus, it is desirable to have a diagnostic system for the real-time monitoring of computer board status and diagnostics during run-time operations, which is not reliant upon intelligent and software controlled microprocessors or micro-controllers, which can generate diagnostic status without any functioning microprocessor or micro-controller, which is universal and adaptable, and which is capable of being installed on practically any type of computer board irrespective of that computer board's architecture.

SUMMARY OF THE INVENTION

Accordingly, the present invention is an on-board diagnostic system which comprises dedicated hardware for performing run-time diagnostics on a computer board having several functional sections. The diagnostic system utilizes a serial token ring network, which preferably has a software-independent, hardware core, comprising a non-intelligent master device and a plurality of non-intelligent slave devices. The master and slave devices are all interconnected via a dedicated serial data bus which operates independently of the on-board CPUs and on-board CPU buses.

Preferably, each functional section of the computer board has one or more dedicated slave devices which gather that section's status discretes and status messages. The diagnostic system includes one or more destination devices, such as LED or LCD display devices or destination microprocessors which are also coupled to the serial data bus. Furthermore, the master device has a plurality of token line outputs, each of which is connected to a particular one of the slave devices.

In operation, each slave device is responsible for monitoring a particular section of the computer board. The master device polls each slave device by activating the corresponding token line on each slave device for a predetermined period of time, one at a time, until the master device is alerted by a slave device that a change of state has occurred in the status signals of that particular section. If a particular section of the board is running normally, the slave device responsible for that section will not respond to the master device's next token line activation. However, if there is a change in state for that particular section of the board, the corresponding slave device will begin transmitting data on the serial bus the next time that the Master device activates the token line for that slave device.

Once the master device sees this activity on the serial bus, the master device will then maintain the corresponding token line active for a predetermined period of time in order to receive a bit-stream from the corresponding slave device over the serial data bus. Preferably, the bit-stream contains a source address (the address of the slave device sending the message), a destination address (the address or addresses to which the message data is to be sent) and the data which indicates the change. The master device will then transmit the diagnostic data to the particular destination devices indicated by the destination addresses.

Preferably, the diagnostic system, by default, powers up "enabled", so that it can provide status to the destination LEDs even if the on-board microprocessors or microcontrollers are all non-functional. The present invention also provides real-time system status and diagnostics during normal run-time operation. It monitors and reports the most critical system errors. i.e., parity errors, watchdog timeouts, bus timeouts, bus configuration errors, and communication errors such as fiber-optic or Ethernet link errors.

Therefore, it is an object of the present invention to provide a run-time diagnostic system which is capable of performing diagnostics on a computer board without any functioning CPUs; which is universal and adaptable for nearly every type of single board computer system; which is clean and simple in design; and which is designed to operate in absence of any operational intelligent or software-controlled devices such as microprocessors or microcontrollers.

These and other objects and advantages of the present invention will become apparent from the following description, the accompanying drawings and the appended claims.

DETAILED DESCRIPTION

Figure 1:
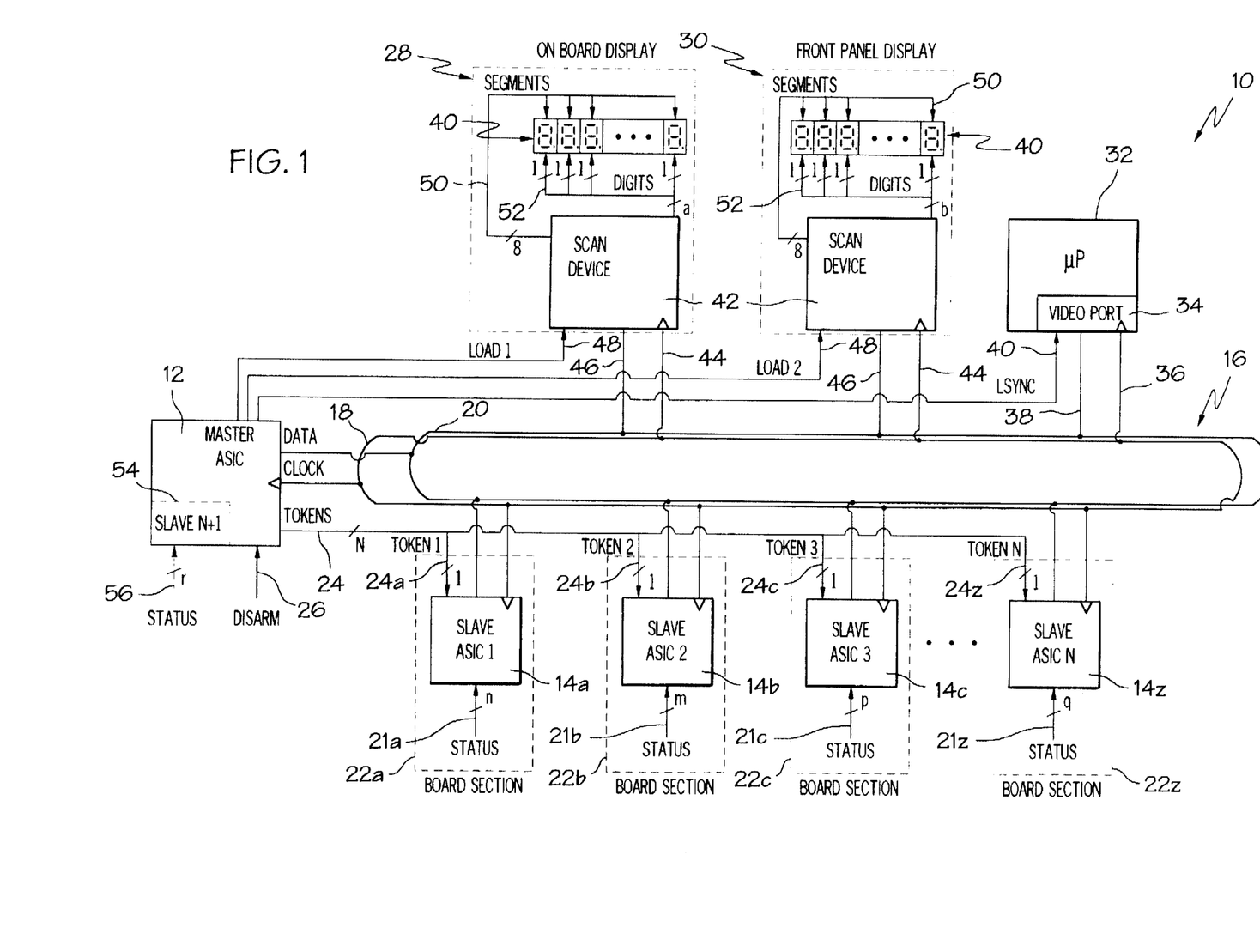
FIG. 1 is a schematic diagram of the on-board diagnostic system of the present invention.

As shown in FIG. 1, the on-board diagnostic system 10 of the present invention comprises a master device 12 and a plurality of slave devices 14a, 14b, 14c, . . . 14z all of which are inter-connected via a two-line serial bus 16 comprising a serial data line 20 and a clock line 18. The master and slave devices are both non-intelligent devices, that is, they are "hardware" devices whose internal functions are not directed by a software program. Therefore the present invention comprises a hardware core which is not susceptible to the failures and errors of diagnostic systems utilizing and relying upon intelligent devices. The master and slave devices can be fabricated from standard TTL devices, CMOS devices, or incorporated into single or multiple chip implementations such as programmable logic arrays (PALs), field programmable gate arrays (FPGAs), 7400 series logic, application specific integrated circuits (ASICs) or any hardware description language (HDL) based device; and in a preferred embodiment, the master and slave devices are ASIC devices.

Each of the slave devices 14a–14z is responsible for monitoring status signals on status lines 21a, 21b, 21c, ... 21z from particular sections 22a, 22b, 22c, . . . 22z, of the computer board. Each of these computer board sections 22a–22z have one or more dedicated microprocessor, microcontroller or other intelligent processor devices (not shown, hereinafter referred to as "CPU devices"). It should be noted, however, that it is not necessary that a computer board section 22a–22z have a CPU device.

The number of status lines 21a–21z for each computer board section can vary depending upon the activities performed and the number of components in the corresponding computer section. For example, the status lines 21a of computer board section 22a will consist of n lines, the status lines 21b of computer board section 22b will consist of m lines, the status lines 21c of computer board section 22c will consist of p lines, and the status lines 21z of computer board section 22z will consist of q lines. These status lines may be coupled to discrete status output pins from the various components present in the particular computer sections, or a set of the status lines may be used to send encoded status data from the particular computer sections. These status lines 21a–21z could therefore be used to monitor signals such as parity errors, watchdog timeouts, bus timeouts, bus configuration errors, fiber-optic errors and Ethernet link errors.

Each of the slave devices 14a–14z also has a token line 24a, 24b, 24c, . . . 24z extending between it and the master device 12. Therefore, the master device will have N number of token line outputs, where N is the number of slave devices.

The on-board diagnostic system 10 also includes at least one, and preferably a series of, destination devices which, in the preferred embodiment, include an on-board display device 28, a front panel display device 30 and a microprocessor device 32 such as the IOP of the raster-printer controller described above. Each of these destination devices is also preferably coupled to the serial bus 16.

The destination microprocessor 32 receives serial data through an internal video port 34 having a clock input 36, serial data input 38, and an LSYNC input signal 40. Although not shown in FIG. 1, the destination microprocessor 32 preferably resides in one of the computer board sections 22a–22z, and is capable of having status lines from the slave device in the corresponding board section coupled to its discrete status pins.

The display devices 28, 30 each have a plurality of seven or eight digit LED or LCD display modules 40 controlled by a scan device 42. The scan devices 42 for use with the present invention are commercially available as MAX7219CWG LED Display Drivers from Maxim Integrated Products, Inc., Sunnyvale Calif., and have clock input lines 44, serial data input lines 46, a LOAD signal input line 48, several segment output lines 50 (the number of which is usually seven or eight, depending upon the number of segments in the display modules), and several digit output lines 52 (the number of which depends on the number of display modules 40). The scan devices 42 translate the incoming serial data from the serial line 20 to the display modules 40 according to the scan devices' pre-configuration or setups. The operation of the scan devices 42 and display modules 40 is conventional and widely known in the art, and therefore, no additional disclosure of their operation need be provided here.

The master device 12 may also include an optional software disarm input line 26 which could be activated by one of the on-board CPUs to disable the diagnostic system 10. Preferably the diagnostic system powers up "armed" such that diagnostic data can be reported by the display devices 28, 30 even if all on-board CPUs are inoperational. The software disarm input line 26 may be utilized, for example, if the serial bus 16 is needed for temporary processes unrelated to the diagnostic system 10.

It should be apparent that a master ASIC device may be designed to include the hardware of one of the slave devices in an effort to save space. This optional internal slave device 54, which receives status signals 56 from one of the computer board's functional sections, will operate substantially identical to the other slave devices 14a–14z.

Figure 2:
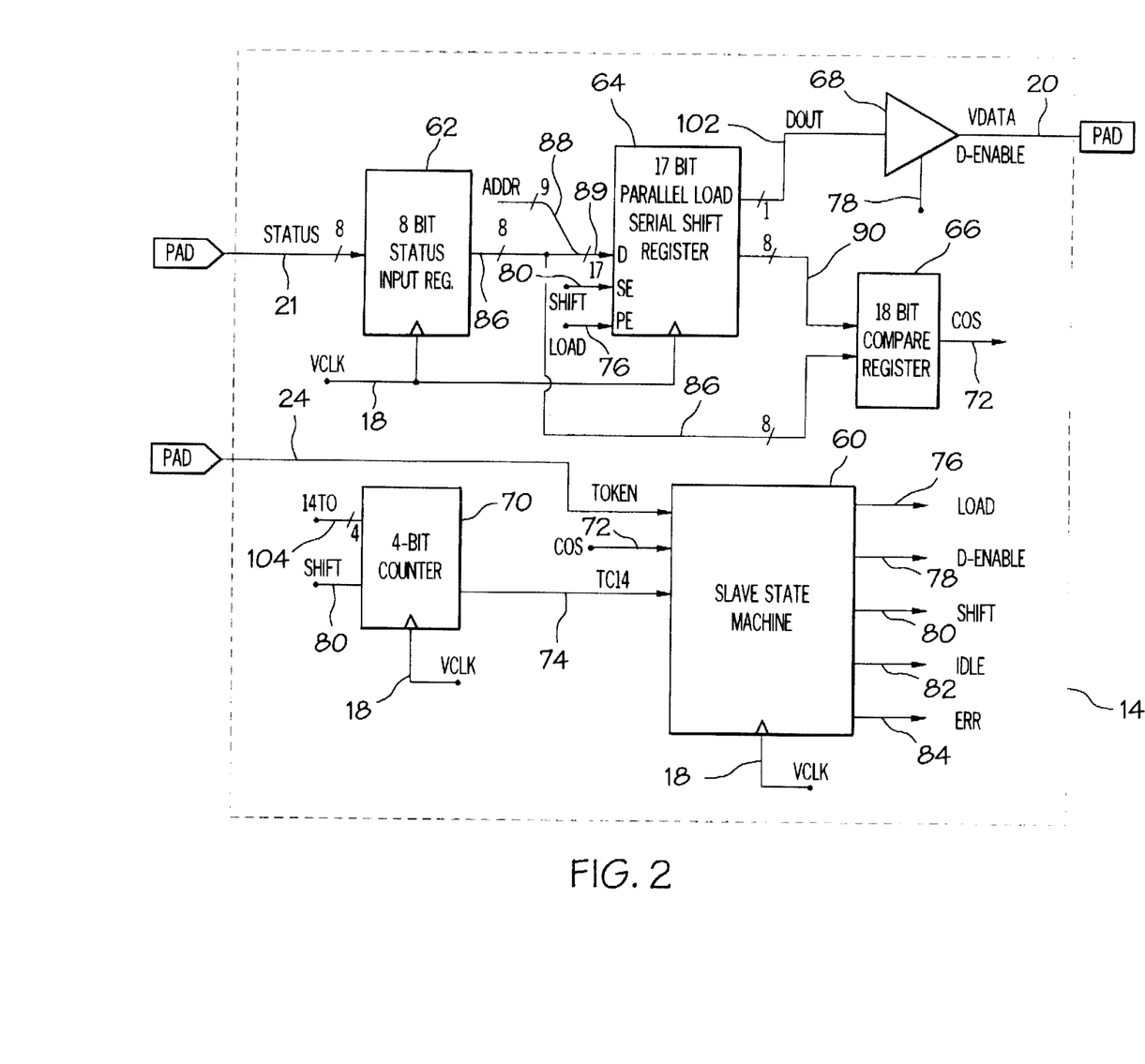
FIG. 2 is a block diagram of a slave ASIC device design for use with the on-board diagnostic system of the present invention.
Figure 3:
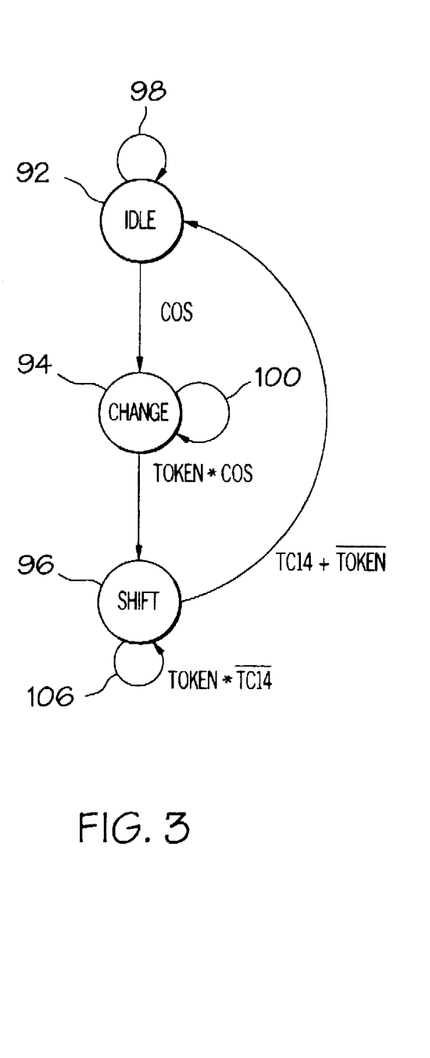
FIG. 3 is a state diagram representing state machine operations of the slave ASIC device of FIG. 2.

As shown in FIGS. 2 and 3, the hardware design of a slave ASIC device 14 for use with the preferred embodiment of the present invention will typically comprise a Slave State Machine 60, a 8-bit Status Input Register 62, a 17-bit Parallel Load/Serial Shift Register 64, a 8-bit Compare Register 66, a Serial Output Driver 68, and a 4-bit Output Data Band-Width Counter 70. Each of these hardware devices is synchronized via the clock line 18.

The Slave State Machine 60 has three inputs, the token line input (TOKEN) 24 corresponding to the particular slave device, a "change of state" flag (COS) 72 which is generated by the Compare Register 66, and a "count down" flag (TC14) 74 generated by the Output Data Band-Width Counter 70. The outputs of the Slave State Machine 60 include a "load" signal (LOAD) 76, a "data enable" signal (D-ENABLE) 78, a "shift serial data out" signal (SHIFT) 80, an "idle" signal (IDLE) 82 and an "error" signal (ERR) 84.

The COS flag 72 is generated as follows. For each cycle of the clock line 18 the Status Input Register 62 will latch a set of status signals from status lines 21 coupled to components in the slave device's assigned computer board section. On the following clock cycle, the latched status bits 86 are simultaneously sent to the Parallel Load/Serial Shift Register 64 and to the Compare Register 66. The status bits 86 which are sent to the Parallel Load/Serial Shift Register 64 are combined with a 9-bit "source and destination address" bit-string (ADDR) 88 to form the 17-bit SATRN data packet 89. The ADDR bit-string 88 identifies a source address (identifying this particular slave device) and the destination address (identifying the destination devices to be sent the SATRN data packet), as will be described in greater detail below. The ADDR bit-string 89 may be hard-wired.

Also on this clock cycle, the Parallel Load/Serial Shift Register 64 will send "previous" status bits 90, latched to it on the previous clock cycle, to the Compare Register 66. The Compare Register will thus compare the present status bits 86 with the "previous" status bits 90, and if there is a difference between the two, the Compare Register will indicate the change of state by setting the COS flag 72.

As will be described in greater detail below, the token line input 24 is activated by the master device 12 during the polling sequence.

As shown in FIG. 3 the Slave State Machine 60 has three operative states, the IDLE state 92, the CHANGE state 94 and the SHIFT state 96. The Slave State Machine, when in the IDLE state 92, will remain in the IDLE state until COS flag 72 is active. This IDLE loop is signified in the state diagram by arrow 98. Also, during this IDLE state, the IDLE output signal 82 will remain active.

Once the COS flag input 72 is activated, the Slave State Machine 60 advances to the CHANGE state 94 in which the Slave State Machine waits for the token line 24 to be activated by the master device 12. This wait is signified in the state diagram by arrow 100. When the Slave State Machine 60 reaches the CHANGE state 94, the Slave State Machine activates the LOAD output signal 76 which is fed to the Parallel Load/Serial Shift Register 64. This LOAD signal, when received by the Parallel Load/Serial Shift Register, causes the Parallel Load/Serial Shift Register to load the present SATRN data packet 89 into its internal serial shift register.

Finally, when the Slave State Machine 60 sees the token line 24 active while in the CHANGE state 94, the state machine will advance to the SHIFT state 96. Upon entering the SHIFT state 94, the Slave State Machine activates the SHIFT output signal 80 and the D-ENABLE output signal 78. The SHIFT signal is sent to the Parallel Load/Serial Shift Register 64, which causes the Parallel Load/Serial Shift Register to begin shifting the SATRN data packet 89 out through the serial output line 102, into the Serial Output Driver 68, which has been enabled by the D-ENABLE signal 78. The output of the Serial Output Driver is directly coupled to the serial data line 20. The SHIFT signal is also sent to the Output Data Band-Width Counter 70 which causes the Output Data Band-Width Counter to begin counting down from a predetermined count value taken from countdown preset lines (14TO) 104, which is set to fourteen in the preferred embodiment.

The Slave State Machine 60 will remain in the SHIFT state 96, in which the Parallel Load/Serial Shift Register is continuously shifting the SATRN data packet 89 to the serial output line 102, one bit at a time, until the TC14 flag 74 is activated by the Output Data Band-Width Counter 73 indicating that the predetermined count has timed out. This SHIFT state timer loop is signified in the state diagram by arrow 106. Once the state machine sees that the TC14 flag is activated, the state machine then advances back to the IDLE state 92, which is signified in the state diagram by arrow 108.

Figure 4:
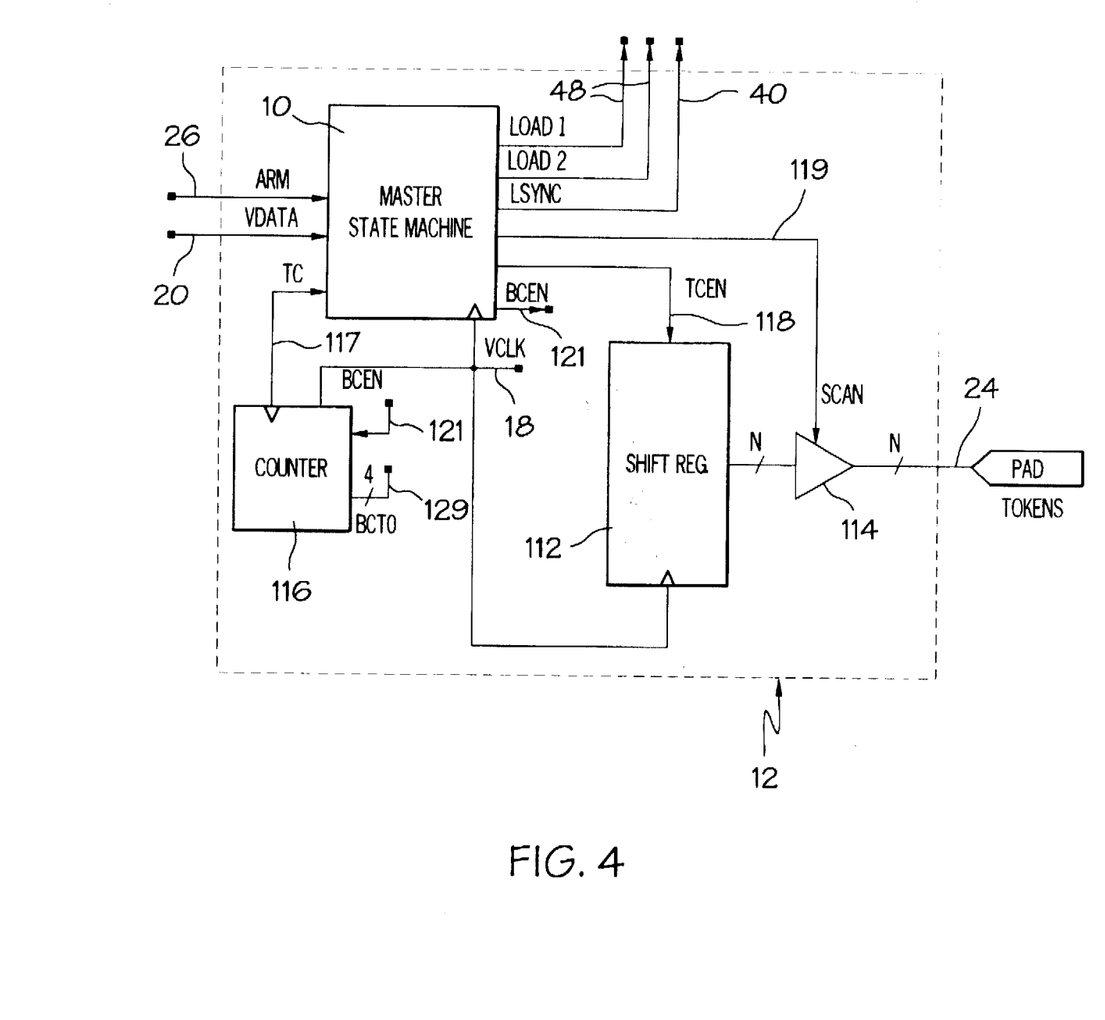
FIG. 4 is a block diagram of the a master ASIC device design for use with the on-board diagnostic system of the present invention.
Figure 5:
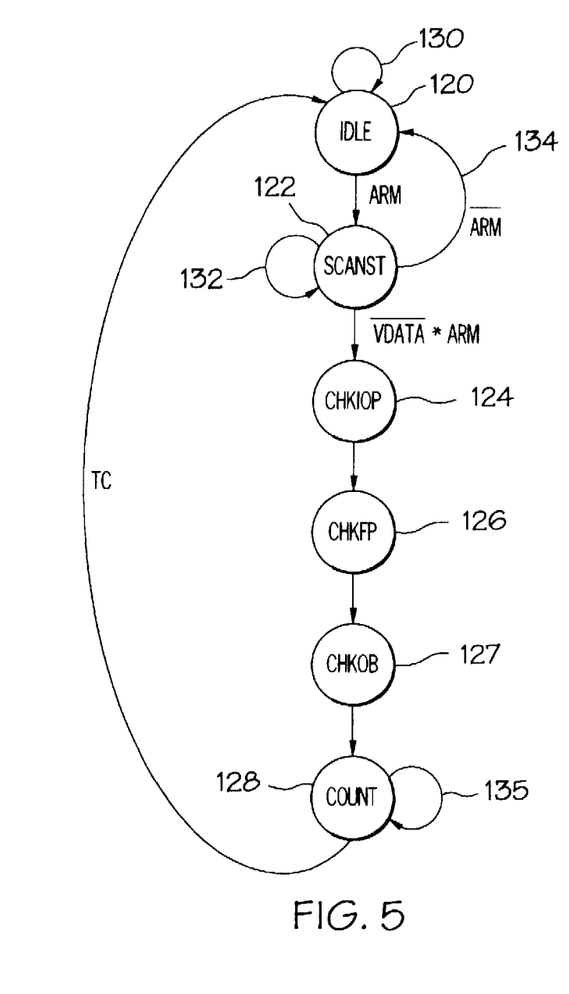
FIG. 5 is a state diagram representing state machine operations of the master ASIC device of FIG. 4.

As shown in FIGS. 4 and 5 the hardware design of a master ASIC device 12 for use with the preferred embodiment of the present invention will typically comprise a Master State Machine 110, a Token Output Shift Register 112, a Token Output Driver 114, and a Terminal Counter 116. The inputs to the Master State Machine 110 are the "software arm/disarm" signal (ARM) as seen on the software arm input line 26, the "terminal count" flag (TC) 117 and the serial data line (VDATA) 20. The outputs of the Master State Machine 110 are the load signals 48 sent to the scan devices 42 of the on-board display device 28 and the front panel display device 30; and the LSYNC signal 40 which is sent to the destination microprocessor's 32-bit video port 34. The Master State Machine also outputs a "token counter enable" flag (TCEN) 118, a "token output enable" flag (SCAN) 119, and an "enable counter" flag (BCEN) 121. The Token, Output Shift Register 112 has N token line outputs 24 where N is the number of slave devices 14. The Master State Machine 110, the Token Output Shift Register 112 and the Terminal Counter 116 are all synchronized via the clock line signal 18.

As shown in FIG. 5 the Master State Machine 110 has five operational states, an IDLE state 120, a POLL state 122, a CHKIOP state, 124 a CHKFP state 126, a CHKOB state 127 and a COUNT state 128. The Master State Machine 110 initializes into to the IDLE state 120, in which the Master State Machine will wait, signified in the state diagram by arrow 130, until the ARM signal 26 is activated. As mentioned above, the diagnostic system 10 will preferably power-up with the ARM signal activated.

Once the ARM signal is active, the Master State Machine then advances to the POLL state 122, where it will wait, designated in the state diagram by arrow 132, until either the ARM signal is deactivated or until the VDATA input on the serial data line 20 activates (the serial data line 20 is a tri-stated line, active low). If, in the POLL state 122, the ARM signal is deactivated, the Master State Machine will return to the IDLE state 120, designated in the state diagram by arrow 134.

While in the POLL state 122, the master device 12 is polling the slave devices 14a–14z by sequentially toggling on and off each of the slave devices' token lines 24. This continuous sequence of toggling the slave devices' token lines is enabled, upon entering the POLL state 122, by the Master State Machine by activating the TCEN output signal 118 and the SCAN output signal 119. If, while in the POLL state 122, the Master State Machine sees VDATA line activated (reset), which means that a slave device with its corresponding token line activated is beginning to transmit a SATRN data package over the serial data line 20, the Master State Machine will advance to the CHKIOP state 124 and will deactivate the TCEN line 118 such that the present token line for the specific slave device will remain active.

In the CHKIOP state 124, the Master State Machine checks a predefined bit in the SATRN data package to see if the address bit pertaining to the IOP destination microprocessor 32 is set. If set, the Master State Machine will then toggle the LSYNC line 40 such that the video port 34 on the destination microprocessor 32 will begin receiving the SATRN data package via the serial data line 20. The Master State Machine then advances to the CHKFP state 126 in which the Master State Machine checks another predefined bit in the SATRN data package to see if the address bit pertaining to the front-panel display device 30 is set. If this bit is set, the Master State Machine will know to set the corresponding load input 48 for the front panel display device 30 at the end of the SATRN data package bit-string. The state machine then advances to the CHKOB state 127 in which the Master State Machine checks another predefined bit in the SATRN data package to see if the address bit pertaining to the on-board display device 28 is set. If this bit is set, the Master State Machine will know to set the corresponding load input 48 for the on-board display device 28 at the end of the SATRN data package bit-string.

The Master State Machine 110 then advances to the COUNT state 128, in which the Master State Machine activates the BCEN line 121, and then waits until the Terminal Counter 116 activates the TC flag 117, indicating that the Terminal Counter has counted down from the predetermined count value taken from the BCTO lines 129. This delay allows sufficient time for the entire SATRN data packet to have been sent over the serial data line 20. When the TC flag 117 has been activated, the Master State Machine will toggle the load signals 48 for the front panel display device 30 and the on-board display device 28 if their respective address bits were set in the SATRN data package as discussed above; and will then return to the IDLE state 120.

Figure 6:
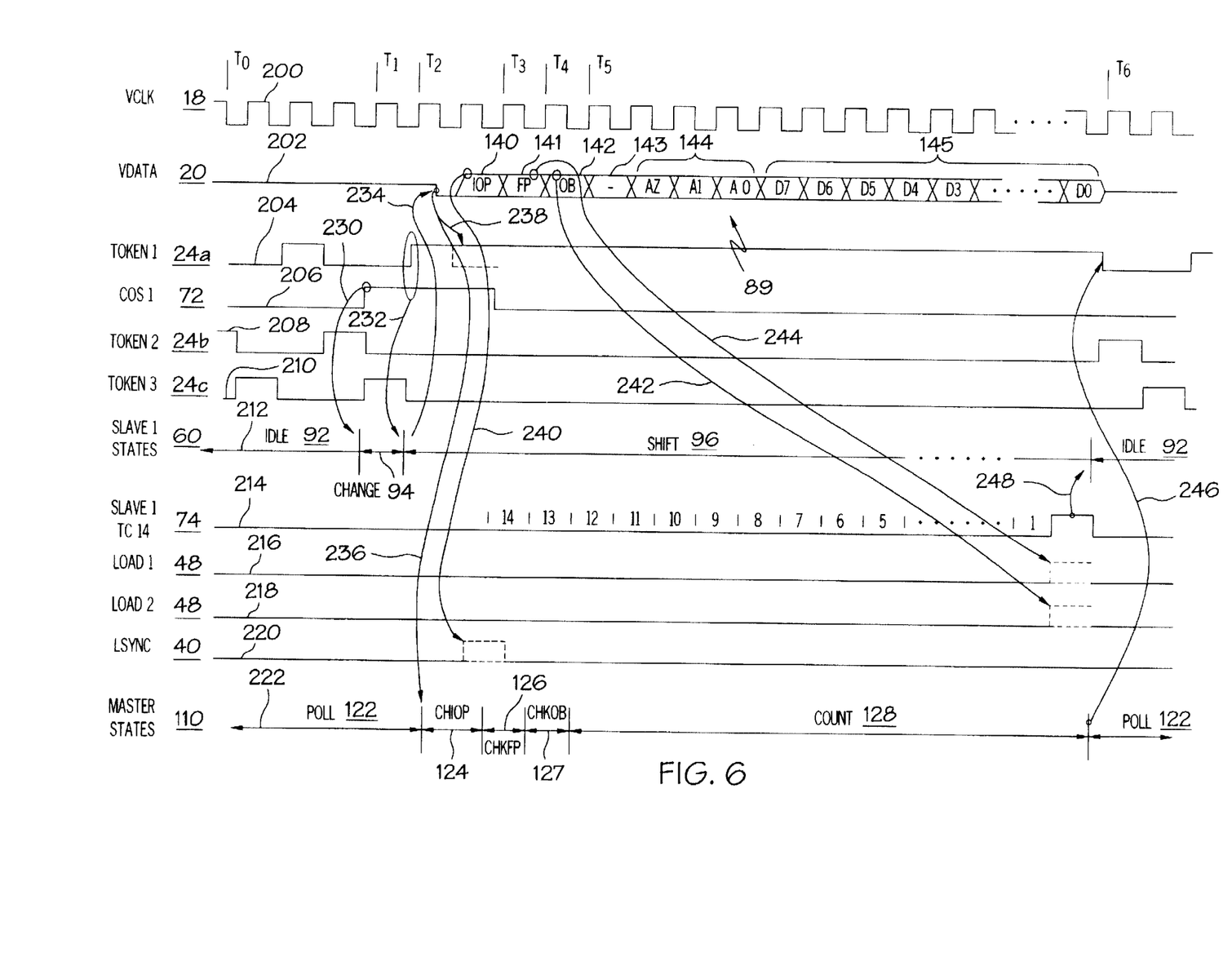
FIG. 6 is a signal diagram for an example operation of the diagnostic system of the present invention.

The on-board diagnostic system process can now be discussed with reference to the example signal diagram as shown in FIG. 6. For purposes of the example, the on-board diagnostic system will include three slave devices, slave 1, slave 2 and slave 3 each respectively having token line inputs labeled TOKEN 1, TOKEN 2 and TOKEN 3. The example diagnostic system will also have three destination devices, a front panel display device, an on-board display device and a input/output microprocessor device (IOP).

As shown in FIG. 6, VCLK signal line 200 represents the activity on the clock line 18; VDATA signal line 202 represents the activity on the serial data line 20; TOKEN 1 signal line 204 represents the activity on the token line 24a input to the slave 1 device; COS 1 signal line 206 represents the activity of the change of state flag 72 in the slave 1 device; the TOKEN 2 signal line 208 represents the activity of the token line 24b input to the slave 2 device; the TOKEN 3 signal line 210 represents the activity of the token line 24c input to the slave 3 device; the SLAVE 1 STATES signal line 212 represents the particular operational state that the Slave State Machine 60 is in; the SLAVE 1 TC14 line 214 represents the activity of the "count down" flag (TC14) 74 in the slave 1 device; the LOAD 1 signal line 216 represents the activity of the load signal input 48 to the on-board display device 28; the LOAD 2 signal line 218 represents the activity of the load signal input 48 to the front panel display device 30; the LSYNC signal line 220 represents the activity of the LSYNC line 40 input into the video port 34 of the IOP microprocessor device 32; and the MASTER STATES signal line 222 represents the operative state that the Master State Machine 110 is in.

It is assumed that, at the beginning of this example, the master device 12 is operating in the POLL state 122, in which the token lines (TOKEN 1, 2 & 3) are sequentially toggled on and off for each of the slave devices. At time T1 the slave 1 device sets the COS flag 72 and advances to the CHANGE state 94, as indicated by arrow 280, resulting from a change in the status signals on status lines 21 which that particular slave device has been monitoring. Therefore, the next time that the master device 12 activates the TOKEN 1 signal (at time T2), the slave 1 device then advances to the SHIFT state 96 and begins to transmit the 17-bit SATRN data packet 89 on the serial data line 20 as indicated by arrow 234. Because the first bit of the SATRN data packet is always zero, the Master State Machine monitors VDATA line 20 for a "low" signal while in the POLL state. Once the Master State Machine 110 sees the VDATA line low, it then advances to the CHKIOP state 124 as indicated by arrow 236. As discussed above, when the Master State Machine 110 sees the VDATA line low, it will deactivate the TCEN line 118 (FIG. 4) such that the present token line 24a will remain active. This is indicated by arrow 238.

The next significant bit in the SATRN data packet 89 is the IOP bit 140 which is the address bit pertaining to the IOP destination microprocessor 32; the third bit is the FP bit 141 which is the address bit pertaining to the front-panel display device 30; the fourth bit is the OB bit 142 which is the address bit pertaining to the on-board display device 28; the fifth bit is a null bit 143; the next three bits are the source address bits 144 for identifying which slave device transmitted the packet; and the last eight bits are the data bits 145 transmitted by the slave device.

In the CHKIOP state 124, the master device checks the state of the IOP bit 140 in the SATRN data packet 89 sent by the slave 1 device. Also, the master device will keep the TOKEN 1 line active until the entire bit stream has been shifted out from the slave 1 device. At time T3 the Master State Machine advances to the CHKFP state 126 in which the master device checks the state of the FP bit 141 in the SATRN data packet 89, and at time T4 the Master State Machine advances to the CHKOB state 127 in which the master device checks the state of the OB bit 142 in the SATRN data bit stream. As discussed above, when the Master State Machine sees the IOP bit 140 set, it will then toggle the LSYNC line 40, as indicated by arrow 240, such that the video port 34 (FIG. 1) on the destination microprocessor 32 will begin receiving the SATRN data package via the serial data line 20. Additionally, when the Master State Machine sees the FP bit 141 set, it will then know to toggle the appropriate load input 48 corresponding to the front panel display device 30 (FIG. 1). This is indicated by arrow 242. Finally, when the Master State Machine sees the OB bit 142 set, it will then know to toggle the appropriate load input 48 corresponding to the on-board display device 28 (FIG. 1). This is indicated by arrow 244

At time T5 the Master State Machine advances to the COUNT state 128 in which the master device waits until the entire SATRN data packet 89 stream has been transmitted by the slave 1 device. Therefore, at the end of this count T6, the master device will deactivate the TOKEN 1 line, as indicated by arrow 246, and then will return to the POLL state 122; and the slave TC14 flag 74 will also be activated in the slave 1 device causing the corresponding Slave State Machine to return to its IDLE state 92, as indicated by arrow 248.

As can be seen in the above descriptions and in the example operation, in the preferred embodiment, the master and slave devices 12, 14 perform very little processing on the status discretes; and the master device merely performs a systematic operation of transmitting the status signals, taken from the status lines 21, to the destination devices in an orderly fashion, using a single data line 20. Thus the preferred embodiment of the invention can be generally described as a method for allowing the destination devices to monitor a multitude of status discretes from a multitude of on-board devices without having to route a line between each and every one of the status discretes and the destination devices.

While the structure of the diagnostic system and the method of operation for the diagnostic system herein described constitutes preferred embodiments of this invention; it is to be understood that the present invention is not limited to this precise structure and method.

For example, it should be apparent to one of ordinary skill in the art that it is within the scope of the invention that the discrete token lines 24 may be removed and that the master device 12 can be configured poll the each of the slave devices 14 using a "token" sent over the serial data bus 16, where the "token" can be an encoded bit-stream identifying the particular slave device being polled; it should be apparent to one of ordinary skill in the art that because the master device 12 "knows" which slave device is being polled, it is not necessary for the SATRN data packet to include the source address bits; it should be apparent to one of ordinary skill in the art that the SATRN data packet 89 may have different numbers of address bits 144 and/or data bits 145, and may include additional types of useful information not required in the above embodiments; and further, it should be apparent to one of ordinary skill in the art that either the master device, the slave devices, or both may be designed to perform limited signal conditioning or processing of the diagnostic depending upon the desired configuration and/or design requirements of the system.

Therefore, it is to be understood that changes may be made to the embodiments described herein without departing from the scope of the invention as defined in the following claims.

What is claimed is:

1. A method for performing run-time diagnostics on a digital system having a plurality of functional sections, each of the sections having at least one status signal, the method comprising the steps of:

monitoring a plurality of status signals with a plurality of non-intelligent slave devices, said plurality of status signals being generated by a corresponding plurality of functional sections of a digital system;

polling each of said non-intelligent slave devices with a non-intelligent master device; and dispatching run-time diagnostic data from one of said non-intelligent slave devices to said non-intelligent master device in response to said polling step.

2. The method of claim 1, wherein said non-intelligent master device polls said non-intelligent slave devices, one of said non-intelligent slave devices at a time.

3. A method for performing run-time diagnostics on a computer board having a plurality of functional sections, where each of the functional sections is controlled by a dedicated microprocessor, the method comprising the steps of:

monitoring a plurality of status signals with a plurality of non-intelligent slave devices, each of said status signals being generated by a corresponding functional section of a computer board, each of said functional sections being controlled by a dedicated microprocessor, said dedicated microprocessors communicating with one another using a CPU bus, and said non-intelligent slave devices being interconnected by a dedicated serial line;

activating a token signal corresponding to a first one of said non-intelligent slave devices with a non-intelligent master device, said non-intelligent master device being coupled to said dedicated serial line;

said non-intelligent master device monitoring said dedicated serial line for a predetermined period of time;

said first one of said non-intelligent slave devices dispatching run-time diagnostic data to said non-intelligent master device on said dedicated serial line in response to said token signal;

said non-intelligent master device detecting said run-time diagnostic data on said dedicated serial line; and said non-intelligent master device reading said run-time diagnostic data from said dedicated serial line during an extended time period.

4. The method of claim 3, wherein the method is capable of being performed independent of the CPU bus.

5. The method of claim 4, wherein a plurality of destination devices is coupled to said dedicated serial line, and the method further comprising the steps of:

during said extended time period, said first one of said non-intelligent slave devices dispatching a destination address with said run-time diagnostic data on said dedicated serial line; and said non-intelligent master device transmitting destination data derived from said run-time diagnostic data to at least one of said destination devices over said dedicated serial line;

said destination address indicating which of said plurality of destination devices are to receive said destination data.

6. The method of claim 3, wherein said token signal is sent via a discrete token line, each of said non-intelligent slave devices having a discrete token line extending between it and the non-intelligent master device.

7. A run-time diagnostic system for a circuit board having a plurality of functional sections, each of the functional sections having at least one status signal, the run-time diagnostic system comprising:

a plurality of non-intelligent slave devices mounted to the circuit board, each of said non-intelligent slave devices monitoring a status signal from a corresponding functional section;

a data bus mounted to the circuit board, interconnecting said non-intelligent slave devices; and a non-intelligent master device mounted to the circuit board and coupled to said data bus, said non-intelligent master device polls each of said non-intelligent slave devices for run-time diagnostic data derived from said status signal.

8. The run-time diagnostic system of claim 7, further comprising at least one destination device, wherein said non-intelligent master device dispatches destination data derived from said run-time diagnostic data to said destination device.

9. The run-time diagnostic system of claim 8, wherein said nonintelligent master device polls said non-intelligent slave devices, one of said non-intelligent slave devices at a time.

10. The run-time diagnostic system of claim 7, wherein:
at least two of the functional sections are controlled by intelligent processors;
each of said intelligent processors are interconnected by a CPU bus; and
the run-time diagnostic system operates independent of said CPU bus.

11. The run-time diagnostic system of claim 7 wherein:
said non-intelligent master device powers-up enabled; and
at least one of said non-intelligent slave devices powers-up enabled;
whereby, the diagnostic system is capable of reporting diagnostic data absent any operating intelligent devices.

12. A method for performing run-time diagnostics on a digital system having a plurality of functional sections, comprising the steps of:
monitoring a plurality of status signals with a plurality of non-intelligent slave devices, said plurality of status signals being generated by a corresponding plurality of functional sections of a digital system;
polling each of said non-intelligent slave devices with a non-intelligent master device; and
dispatching run-time diagnostic data from one of said non-intelligent slave devices to said non-intelligent master device in response to said polling step;
wherein said polling step includes the step of said non-intelligent master device activating a token line to one of said non-intelligent slave devices for a predetermined period of time, and said non-intelligent master device monitoring an output line coupled to said one of said non-intelligent slave devices while said token line is activated.

13. The method of claim 12, further comprising the steps of:
if, during said predetermined time period, said one of said non-intelligent slave devices transmits data on said output line, then said non-intelligent master device maintaining said token line active, beyond said predetermined time period, for an extended time period; and
during said extended time period, said one of said non-intelligent slave devices performing said dispatching step.

14. The method of claim 13, wherein said one of said nonintelligent slave devices dispatches said run-time diagnostic data on said output line.

15. The method of claim 5, wherein each of said non-intelligent slave devices is coupled to said output line.

16. The method of claim 15, wherein said output line is a serial line.

17. The method of claim 15, further comprising the step of, during said extended time period, said one of said non-intelligent slave devices dispatching a source address on said output line, said source address indicating from which of said plurality of said non-intelligent slave devices said diagnostic data originated.

18. The method of claim 13, wherein at least one destination device is coupled to said output line, and the method further comprises the step of said non-intelligent master device transmitting destination data derived from said run-time diagnostic data to said destination device.

19. The method of claim 18, further comprising the step of, during said extended time period, said one of said non-intelligent slave devices dispatching a destination address on said output line, said destination address indicative of said destination device.

20. A method for performing run-time diagnostics on a digital system having a plurality of functional sections, comprising the steps of:
monitoring a plurality of status signals with a plurality of non-intelligent slave devices, said plurality of status signals being generated by a corresponding plurality of functional sections of a digital system;
polling each of said non-intelligent slave devices, one of said non-intelligent slave devices at a time, with a non-intelligent master device; and
dispatching run-time diagnostic data from one of said non-intelligent slave devices to said non-intelligent master device in response to said polling step;
said polling step including the steps of,
said non-intelligent master device transmitting a token signal on a serial line, said token signal corresponding to a particular one of said plurality of non-intelligent slave devices;
said non-intelligent master device monitoring said serial line for a predetermined time period; and
if, during said predetermined time period, said one of said non-intelligent slave devices transmits data on said serial line, then said non-intelligent master device retrieving data from said serial line, beyond said predetermined time period, for an extended time period.

21. The method of claim 20, wherein said one of said non-intelligent slave devices performs said dispatching step during said extended time period.

22. A run-time diagnostic system for a circuit board having a plurality of functional sections, each of the functional sections having at least one status signal, the run-time diagnostic system comprising:
a plurality of non-intelligent slave devices mounted to the circuit board, each of said non-intelligent slave devices monitoring a status signal from a corresponding functional section;
a data bus mounted to the circuit board, interconnecting said non-intelligent slave devices;
a non-intelligent master device mounted to the circuit board and coupled to said data bus, said non-intelligent master device polls each of said non-intelligent slave devices for run-time diagnostic data derived from said status signal;
at least one destination device, wherein said non-intelligent master device dispatches destination data derived from said run-time diagnostic data to said destination device; and a plurality of token lines, each of said token lines extending between a corresponding one of said non-intelligent slave devices and said non-intelligent master device, wherein said non-intelligent master device activates said token lines, one at a time, and monitors said data bus while said token lines are active.

23. The run-time diagnostic system of claim 22, wherein said data bus is a serial line.

24. A run-time diagnostic system for a circuit board having a plurality of functional sections, each of the functional sections having at least one status signal, the diagnostic system comprising:

a plurality of non-intelligent slave devices mounted to the circuit board, each of said non-intelligent slave devices monitoring a status signal from a corresponding functional section;

a serial data bus mounted to the circuit board, interconnecting said non-intelligent slave devices;

a non-intelligent master device mounted to the circuit board and coupled to said serial data bus, said non-intelligent master device polls each of said non-intelligent slave devices for run-time diagnostic data derived from said status signal; and a plurality of destination devices coupled to said serial data bus, wherein said run-time diagnostic data includes a destination address indicating which of said plurality of destination devices are to receive said run-time diagnostic data.

25. The run-time diagnostic system of claim 24, further comprising a plurality of token lines, each of said token lines extending between a corresponding one of said non-intelligent slave devices and said non-intelligent master device, wherein said non-intelligent master device activates said token lines, one at a time, and monitors said serial data bus while said token lines are active.

26. The run-time diagnostic system of claim 24, further comprising a clock line interconnecting said non-intelligent master device and said non-intelligent slave devices.

27. A method for performing run-time diagnostics on a digital system having a plurality of functional sections, comprising the steps of:

monitoring a plurality of status signals with a plurality of slave devices, said plurality of status signals being generated by a corresponding plurality of functional sections of a digital system;

polling each of said slave devices with a master device; and dispatching run-time diagnostic data from one of said slave devices to said master device in response to said polling step;

wherein said polling step includes the step of said master device activating a token line to one of said slave devices for a predetermined period of time, and said master device monitoring an output line coupled to said one of said slave devices while said token line is activated.

\* \* \* \* \*

UNITED STATES PATENT AND TRADEMARK OFFICE
CERTIFICATE OF CORRECTION

PATENT NO. : 5,793,946
DATED : August 11, 1998
INVENTOR(S) : Forrest P. Gauthier and Dimitrije L. Jovic It is certified that error appears in the above-identified patent and that said Letters Patent is hereby corrected as shown below:

Claim 9, Col. 11, Line 14, "nonintelligent" should be --non-intelligent--

Claim 11, Col. 11, Line 30 insert --run-time-- after "the"

Claim 14, Col. 11, Line 64 "nonintelligent" should be --non-intelligent--

Claim 15, Col. 11, Line 66 "Claim 5" should be --Claim 14--

Claim 17, Col. 12, Line 8 insert --run-time-- before word "diagnostic"

Claim 18, Col. 12, Line 9 "Claim 13" should be --Claim 15--

Claim 22, Col. 13, Line 5 remove "." after "lines"

Signed and Sealed this

Seventeenth Day of November, 1998

*Attest:*

BRUCE LEHMAN

*Attesting Officer*  *Commissioner of Patents and Trademarks*